(12) United States Patent
Hsieh et al.

(10) Patent No.: US 8,509,486 B2
(45) Date of Patent: Aug. 13, 2013

(54) VEHICLE LICENSE PLATE RECOGNITION METHOD AND SYSTEM THEREOF

(75) Inventors: Jun-Wei Hsieh, Hsinchu (TW); Sin Yu Chen, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 105 days.

(21) Appl. No.: 13/281,619

(22) Filed: Oct. 26, 2011

(65) Prior Publication Data

US 2012/0106802 A1  May 3, 2012

(30) Foreign Application Priority Data

Oct. 29, 2010  (TW) ................................. 99137175 A

(51) Int. Cl.
 *G06K 9/00*  (2006.01)
(52) U.S. Cl.
 USPC .......................................................... 382/105
(58) Field of Classification Search
 None
 See application file for complete search history.

(56) References Cited

U.S. PATENT DOCUMENTS

| | | | | |
|---|---|---|---|---|
| 8,150,207 B2* | 4/2012 | Li et al. | ......................... | 382/281 |
| 2006/0208169 A1* | 9/2006 | Breed et al. | ................... | 250/221 |
| 2006/0274973 A1* | 12/2006 | Mohamed et al. | ............ | 382/281 |
| 2010/0054539 A1* | 3/2010 | Challa | ........................... | 382/105 |
| 2011/0135156 A1* | 6/2011 | Chen et al. | ..................... | 382/105 |

OTHER PUBLICATIONS

T. Naito, T. Tsukada, K. Yamada, and K. Kozuka; Robust Recognition Methods for Inclined License Plates Under Various Illumination Conditions Outdoors, Proc. of IEEE/IEEJ/JSAI International Conference on Intelligent Transportation Systems, pp. 697-702, 1999.
C. Busch, R. Dorner, C. Freytag, H. Ziegler; Feature Based Recognition of Traffic Video Streams for Online Route Tracing, Proc. of IEEE Conference on Vehicular Technology, vol. 3, pp. 1790-1794, 1998.
R. Zunino, S. Rovetta, Vector Quantization for License-Plate Location and Image Coding, IEEE Transactions on Industrial Electronics, vol. 47, pp. 159-167, Feb. 2000.
R. Plamondon, S.N. Srihari, On-Line and Off-Line Handwriting Recognition: A Comprehensive Survey, IEEE Trans. on Pattern Analysis and Machine Intelligence, vol. 22, No. 1, pp. 63-84, Jan. 2000.
M. Shridhar, J.W.V. Miller, G. Houle and L. Bijnagte; Recognition of License Plate Images: Issues and Perspectives, Proc. of the Fifth International Conference on Document Analysis and Recognition, p. 17-20, 1999.

(Continued)

*Primary Examiner* — Nancy Bitar
(74) *Attorney, Agent, or Firm* — Rosenberg, Klein & Lee

(57) ABSTRACT

A vehicle license plate recognition method and a system thereof are disclosed. A region where a vehicle license plate image exists is detected according to the edge densities of an input image and a vehicle license plate specification. A text area of the vehicle license plate image is divided into a plurality of character images. The character images are binarized to obtain a plurality of binarized character images. A plurality of characters is recognized from the binarized character images. The characters are recombined to form a character string. The abovementioned steps are repeated to obtain a new character string from another image of the same vehicle, which is captured at a next time point. The character string is compared with the new character string character by character to obtain a comparison result for verifying reliability of recognition through a voting technique.

17 Claims, 9 Drawing Sheets

(56) References Cited

OTHER PUBLICATIONS

K.K. Kim, K.I. Kim, J.B. Kim, and H.J. Kim; Learning-Based Approach for License Plate Recognition, Proc. of IEEE Workshop on Neural Networks for Signal Processing, vol. 2, pp. 614-623, 2000.

H.A. Hegt, R.J. De La Haye, N.A. Khan; A High Performance License Plate Recognition System, Proc. of IEEE International Conference on Systems, Man, and Cybernetics, pp. 4357-4362, 1999.

M. Yu and Y.D. Kim; An Approach to Korean License Plate Recognition Based on Vertical Edge Matching, Proc. of IEEE International Conference on Systems, Man, and Cybernetics, pp. 2975-2980, 2000.

D.S. Kim, S.I. Chien; Automatic Car License Plate Extraction Using Modified Generalized Symmetry Transform and Image Warping; Proc. of IEEE International Symposium on Industrial Electronics, vol. 3, pp. 2022-2027, 2001.

D. Yan, M. Hongqing, L. Jilin, R. Susu; A High Performance License Plate Recognition System Based on the Web Technique, Proc. of IEEE Proceedings Intelligent Transportation Systems, pp. 518-524, 2001.

R. Parisi, E.D. Di Claudio, G. Lucarelli, G. Orlandi; Car Plate Recognition by Neural Networks and Image Processing, Proc. of IEEE International Symposium on Circuits and Systems, vol. 3, pp. 195-198, 1998.

J.A.G. Nijhuis, M.H. Ter Brugge, K.A. Helmholt, J.P.W. Pluim, L. Spaanenburg, R.S. Venema, M.A. Westenberg; Car License Plate Recognition with Neural Networks and Fuzzy Logic, Proc. of IEEE International Conference on Neural Networks, vol. 5, pp. 2232-2236, 1995.

G.D. Lee, K.S. Kim, D.S. Jeong; Rough Edge Detection of Low Contrast Images Using Consequential Local Variance Maxima, Proc. of IEEE Region 10 Conference on TENCON, vol. 1, pp. 734-737, 1999.

E.R. Lee, P.K. Kim, H.J. Kim; Automatic Recognition of a Car License Plate Using Color Image Processing, Proc. of IEEE Inter. Conf. on Image Processing, vol. 2, pp. 301-305, 1994.

K. Yamaguchi, Y. Nagaya, K. Ueda, H. Nemoto, M. Nakagawa; A Method for Identifying Specific Vehicles Using Template Matching, Proc. of IEEE/IEEJ/JSAI Inter. Conf. on Intelligent Transportation Systems, pp. 8-13, 1999.

T. Naito, T. Tsukada, K. Yamada, K. Kozuka, S. Yamamoto; Robust License-Plate Recognition Method for Passing Vehicles Under Outside Environment; IEEE Tran. on Vehicular Technology, vol. 49, pp. 2309-2319, Nov. 2000.

L. Salgado, J.M. Menendez, E. Rendon, N. Garcia; Automatic Car Plate Detection and Recognition Through Intelligent Vision Engineering, Proc. of IEEE 33rd Annual 1999 International Carnahan Conference on Security Technology, pp. 71-76, 1999.

S.H. Park, K.I. Kim, K. Jung, H.J. Kim; Locating Car License Plates Using Neural Networks, Electronics Letters, vol. 35, pp. 1475-1477, Aug. 1999.

T. Sirithinaphong, K. Chamnongthai; Extracting of Car License Plate Using Motor Vehicle Regulation and Character Pattern Recognition, Proc. of IEEE Asia-Pacific Conference on Circuits and Systems, pp. 559-562, 1998.

D.S. Gao, J. Zhou; Car License Plates Detection from Complex Scene, Proc. of 5th International Conference on Signal Processing, vol. 2, pp. 1409-1414, 2000.

P. Viola, M. Jones; Robust Real-Time Object Detection, IEEE ICCV Workshop on Statistical and Computational Theories of Vision, pp. 1-25, 2001.

P. Viola, M. Jones; Robust Real-Time Face Detection, IEEE IJCV, vol. 57, No. 2, p. 137-154, 2004.

C.P. Papageorgiou, M. Oren, T. Poggio; A General Framework for Object Detection, ICCV, pp. 555-562, 1998.

S. Belongie, J. Malik, J. Puzicha, Shape Matching and Object Recognition Using Shape Contexts, IEEE Transactions on Pattern Analysis and Machine Intelligence, vol. 24, No. 24, pp. 509-522, Apr. 2002.

R. Schapire; The Boosting Approach to Machine Learning an Overview, MSRI Workshop on Nonlinear Estimation and Classification, p. 1-p. 23, 2003.

Y. Freund, R.E. Schapire, A Decision-Theoretic Generalization of On-Line Learning and an Application to Boosting, Journal of Computer and System Sciences, pp. 119-139, 1997.

\* cited by examiner

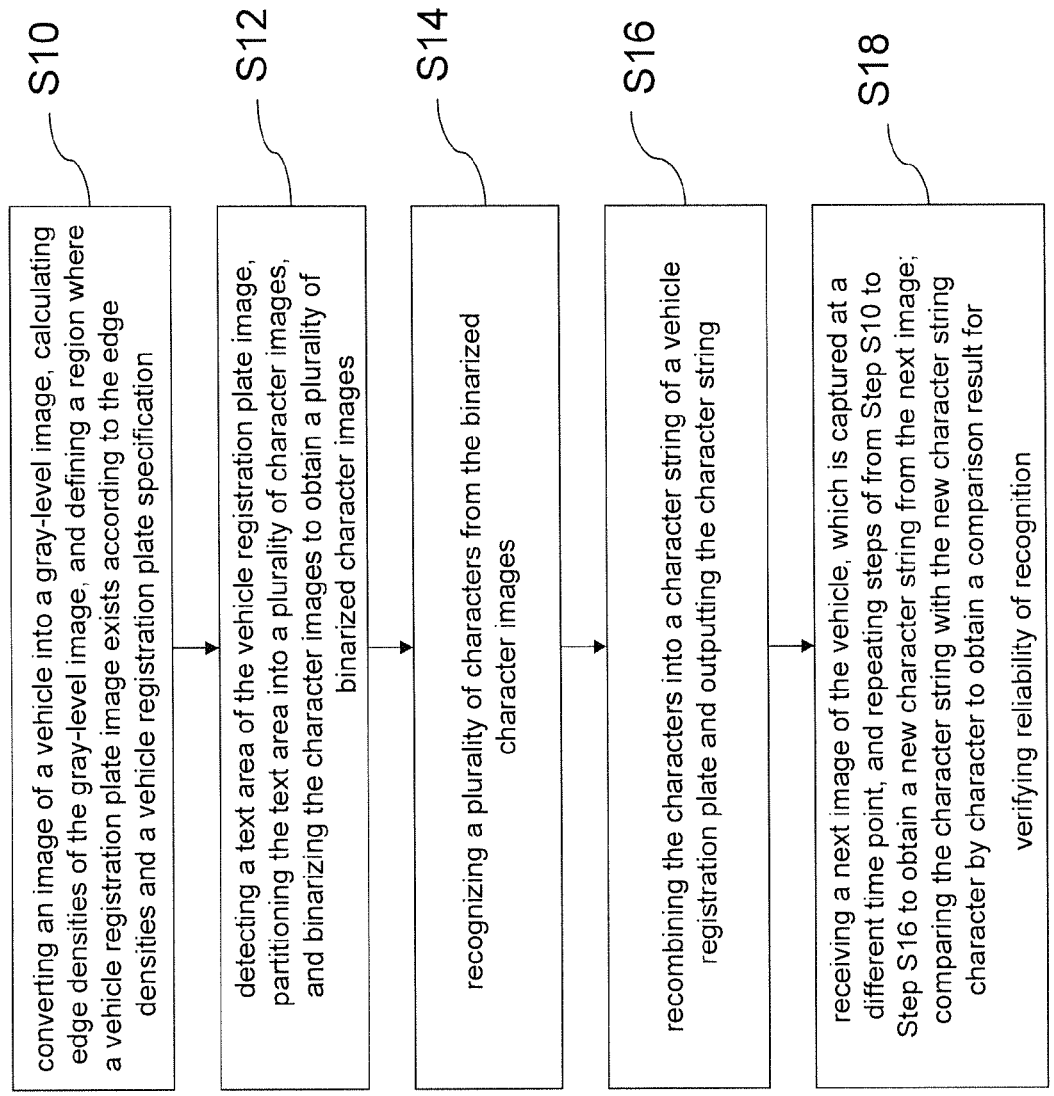

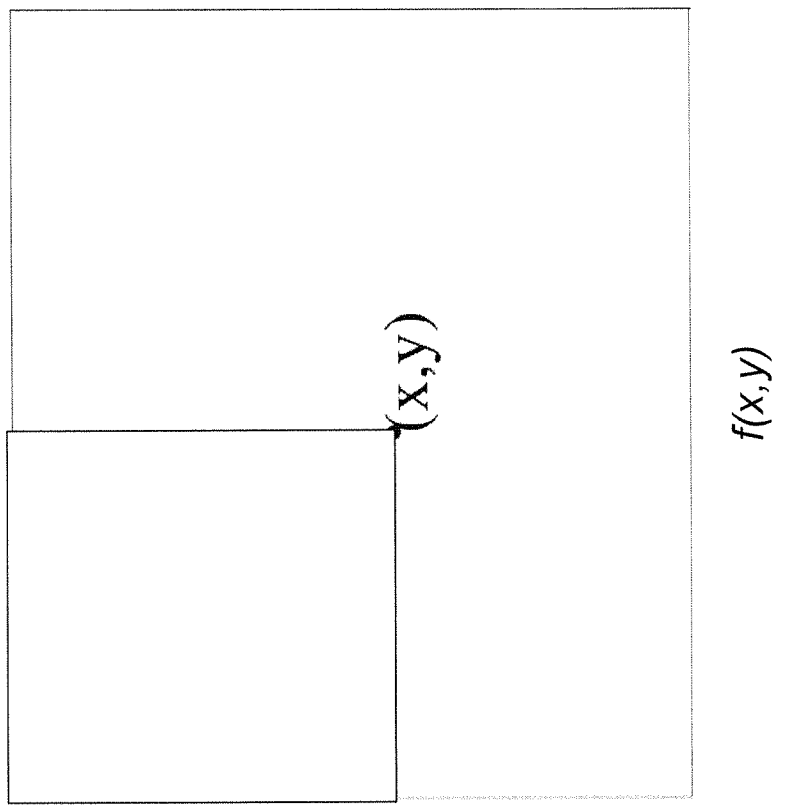

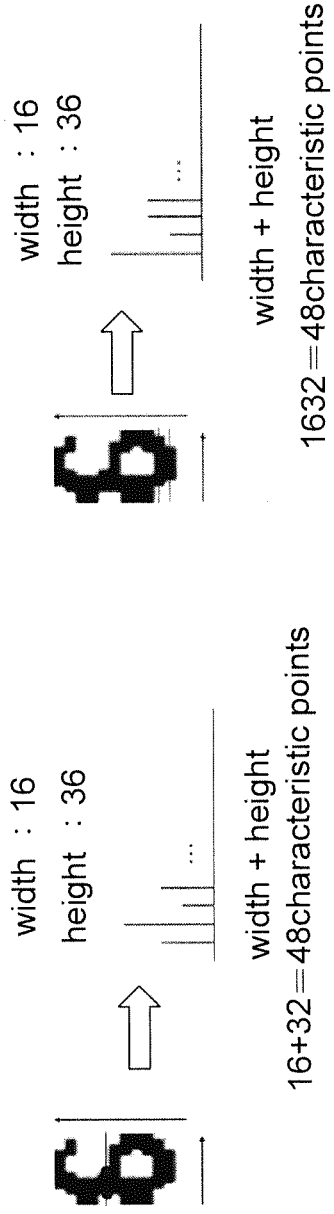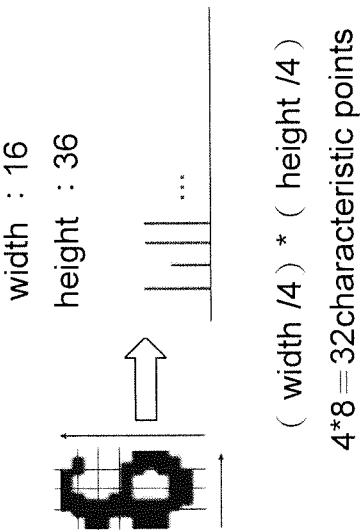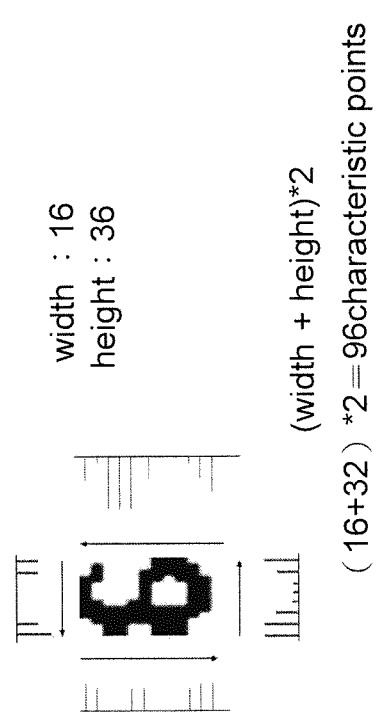

VEHICLE LICENSE PLATE RECOGNITION METHOD AND SYSTEM THEREOF

BACKGROUND OF THE INVENTION

1. Field of the Invention

The present invention relates to a vehicle license plate recognition method and a system thereof, particularly to a method, which can tolerate images captured from various viewing angles in any environment, and which can efficiently eliminate noise from images and fast define the region where the vehicle license plate exists to be recognized in real time.

2. Description of the Related Art

In the field of image processing, the vehicle license plate recognition technology has contributed much to public security and cost reduction via applying to automatic tolling, parking lot management, stolen vehicle detection, etc.

In applications of the vehicle license plate recognition technology, scenes including complicated contents like advertisement signs and traffic signs will disturb the accuracy of recognition; noisy backgrounds of the license plate, the color and style of the vehicle license plate, the decorative accessories, etc., may also affect the result of recognition; various illumination environments, such as daytime, night, rainy day, etc., will also lead to the failure of recognition; different viewing angles will capture inclined license plates. All the abovementioned factors would increase the difficulty of recognizing a vehicle license plate. Further, lights, bumpers, logos, frames, screws and characters on vehicles may have some similar features to those of vehicle license plates and thus will disturb the accuracy of license palate recognition. In conventional license plate recognition technologies, the vehicle license plate will be first binarized to two levels (black and white). Next, the output of binarization is partitioned into several pieces of character-related data through histogram projection. Next, the several pieces of character-related data are input into a classifier, which has been trained for recognizing characters. Then, the recognition results are assembled to obtain a complete license plate identifier (for recognizing characters on the vehicle license plate). The conventional recognition methods are likely to be influenced by noise or contamination on the vehicle license plate. In an image of a vehicle, the license plate often occupies only a small area. However, the small area contains not only the characters of the license plate but also the surroundings of characters. In such a case, it is less likely to obtain stable binarized data. Consequently, a satisfactory recognition result is hard to obtain from the binarized information containing a great amount of noise.

Therefore, the topic subject of the vehicle license plate recognition system is to improve the recognition ability and computation speed thereof. Accordingly, the present invention proposes a vehicle license plate recognition method and a system thereof to overcome the abovementioned problems.

SUMMARY OF THE INVENTION

The primary objective of the present invention is to provide a vehicle license plate recognition method, which uses an edge-labeling technology to detect all possible license plate analogues, wherein the edge information are recorded to fast and precisely define the region where the vehicle license plate exists, whereby the present invention is exempted from spending time on image training that is needed by the conventional vehicle license plate recognition technologies, and on vehicle detection for achieving a high-speed license plate recognition system.

Another objective of the present invention is to provide a vehicle license plate recognition method, which partitions the gray-level images into a plurality of character images and binarizes the character images to obtain a plurality of optimized and stable binarized character images, whereby the present invention solves the problem of low recognition rate caused by a great amount of noise occurring in binarization of the conventional technologies.

In addition, another objective of the present invention is to provide a vehicle license plate recognition method, which uses a voting technique for integrating different recognition results from different frames and returning the final best recognition results for enhancing the robustness of license plate recognition.

To achieve the abovementioned objectives, the present invention proposes a vehicle license plate recognition method, which comprises steps: calculating edge densities of the gray-level image, and defining a region where a vehicle license plate image exists according to the edge densities and a vehicle license plate specification; detecting a text area of the vehicle license plate image, partitioning the text area into a plurality of character regions, and binarizing the character regions to obtain a plurality of binarized characters; recognizing a plurality of characters from the binarized characters; recombining the characters into a character string of the vehicle license plate and outputting the character string through a voting technique; and obtaining a new character string from another image of the same vehicle, which is captured at next time, and comparing the character string with the new character string character by character to obtain a comparison result for verifying and enhancing the accuracy and reliability of recognition.

The present invention further proposes a vehicle license plate recognition system, which comprises a license plate detection module detecting an image, calculating edge densities of the gray-level image, and defining a region where a vehicle license plate image exists according to the edge densities and a vehicle license plate specification; a character partition module connected with the license plate detection module, partitioning the vehicle license plate image into a plurality of character regions, and binarizing the character regions to obtain a plurality of binarized character regions; a character recognition module connected with the character partition module, recognizing characters from the binarized character regions; a character recombination module connected with the character recognition module, recombining the characters into a character string of the vehicle license plate, and outputting the character string; and a voting module connected with the character recognition module, obtaining a new character string generated at next time, comparing the character string with the new character string character by character to generate a comparison result for enhancing the accuracy and reliability of recognition.

Below, the embodiments are described in details to make easily understood the objectives, technical contents, characteristics and accomplishments of the present invention.

BRIEF DESCRIPTION OF THE DRAWINGS

FIG. 2 is a flowchart of a vehicle license plate recognition method according to one embodiment of the present invention;

FIG. 3($a$) is a diagram schematically showing an original image;

FIG. 8(a) is a diagram schematically showing that a character is recognized with a cross-scan method according to one embodiment of the present invention;

FIG. 8(b) is a diagram schematically showing that a character is recognized with a histogram method according to one embodiment of the present invention;

FIG. 8(c) is a diagram schematically showing that a character is recognized with a profile-scan method according to one embodiment of the present invention; and FIG. 8(d) is a diagram schematically showing that a character is recognized with a zoning method according to one embodiment of the present invention.

DETAILED DESCRIPTION OF THE INVENTION

Figure 1:
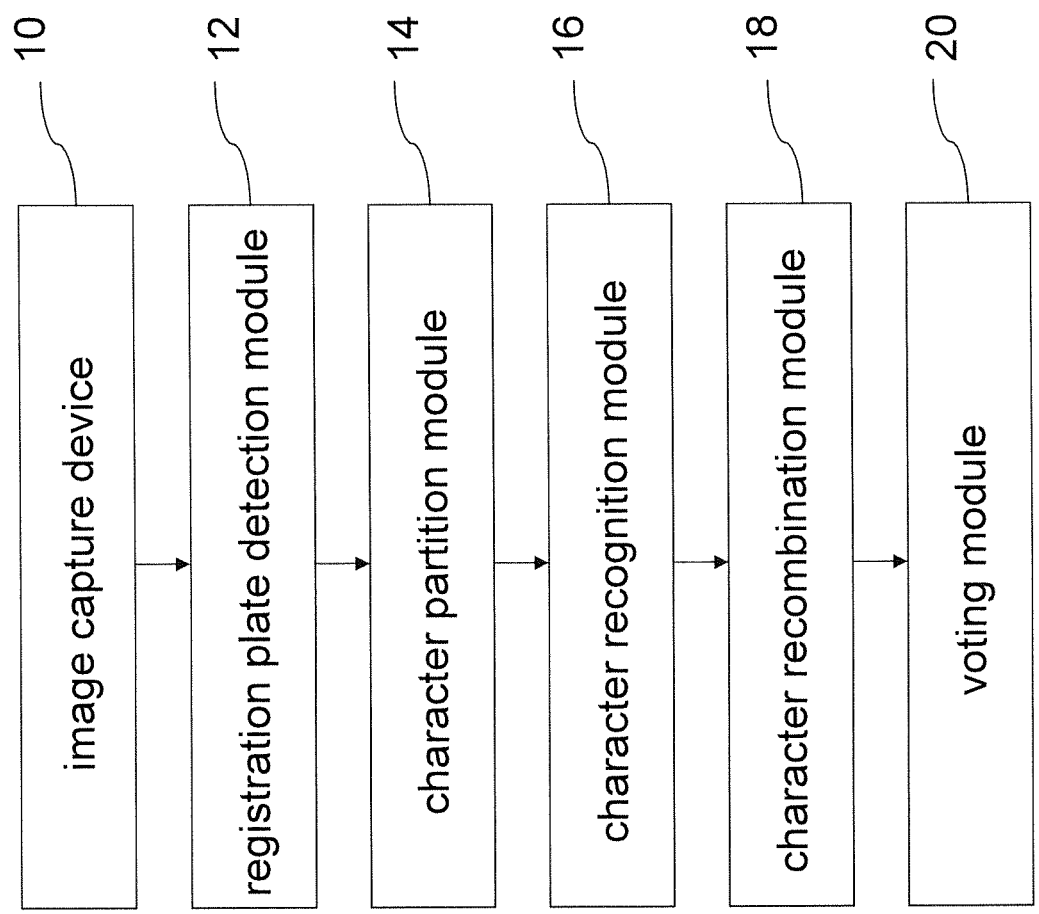
FIG. 1 is a block diagram schematically showing the architecture of a vehicle license plate recognition system according to one embodiment of the present invention.
Figure 3B:
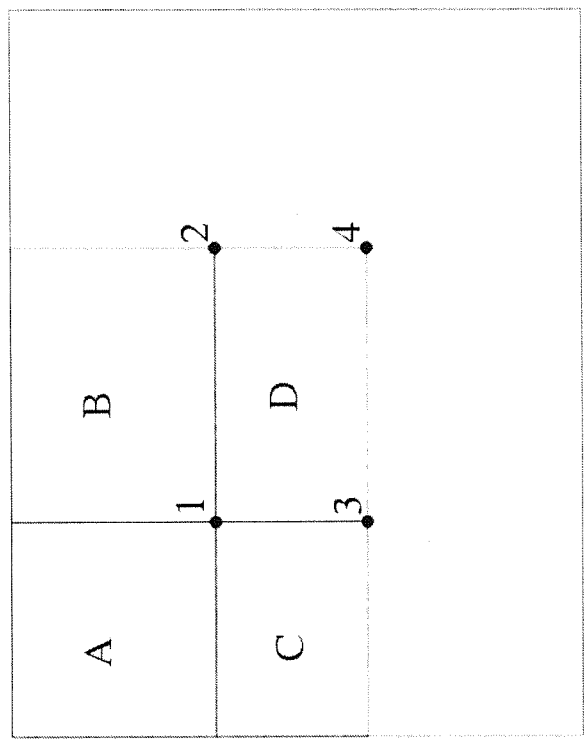
FIG. 3(b) is a diagram schematically showing an integral image according to one embodiment of the present invention.

The present invention proposes a vehicle license plate recognition method and a system thereof to fast and correctly recognize the identifier code of a license plate of a vehicle running at a high speed (referring to FIG. 1 and FIG. 2). FIG. 1 is a block diagram schematically showing the architecture of a vehicle license plate recognition system according to one embodiment of the present invention. FIG. 2 is a flowchart of a vehicle license plate recognition method according to one embodiment of the present invention. In Step S10, after at least one image capture device 10, such as a common camera or a security camera, has captured an image, a license plate detection module 12 detects the image captured by the image capture device 10. The image captured by the image capture device 10 is usually a colored RGB image. The license plate detection module 12 converts the colored image into a gray-level image. For example, the license plate detection module 12 converts the colored image into an 8-bit gray-level image denoted by I(x,y) to effectively simplify the information of the image. In order to calculate the edge densities of the license plate from the input gray image I(x,y), an integral image is used to calculate the sum of pixel gradient magnitudes on the gray-level image I(x,y), as shown in FIG. 3(a) and FIG. 3(b). Let f(x, y) denote the map of gradient magnitude of I(x,y), and let integral image be expressed by S(x, y). f(x,y) can be obtained by using famous Sobel edge operators. S(x,y) is the accumulation result of the gradient magnitudes of pixels in f(x,y) from the origin (0, 0) to a pixel (x, y). The sum of the gradient magnitudes of a region divided by its region size is its edge density. The integral image can be calculated from Equation (1):

$$S(x, y) = \sum_{j=0}^{y} \sum_{i=0}^{x} f(i, j) \tag{1}$$

Suppose that f(x,y) is divided into a plurality of sections. For example, as shown in FIG. 3(b), f(x,y) is divided into four regions A, B, C and D. Thus, the accumulation of the integral images S(x, y) can be used to work out the edge density of an arbitrary region, for example, D via two subtraction operations and an addition operation. Fox example, the edge density of Region D can be worked out from Equation (2):

$$D=S(4)+S(1)-S(2)-S(3) \tag{2}$$

wherein S(4)=A+B+C+D, S(3)=A+C, S(2)=A+B, and S(1)=A, and wherein the value of the integral image of Point 1 is equal to the accumulation of the gradient magnitudes of all the pixels inside Region A, and wherein the value of the integral image of Point 2 is equal to the accumulation of the gradient magnitudes of all the pixels inside Region A and Region B, wherein the value of the integral image of Point 3 is equal to the accumulation of the gradient magnitudes of all the pixels inside Region A and Region C, and wherein the value of the integral image of Point 4 is equal to the accumulation of the gradient magnitudes of all the pixels inside Regions A, B, C and D. Then, the edge density of Region D can be worked out via simple calculations using Equation (2) and divided by its region size.

Figure 4:
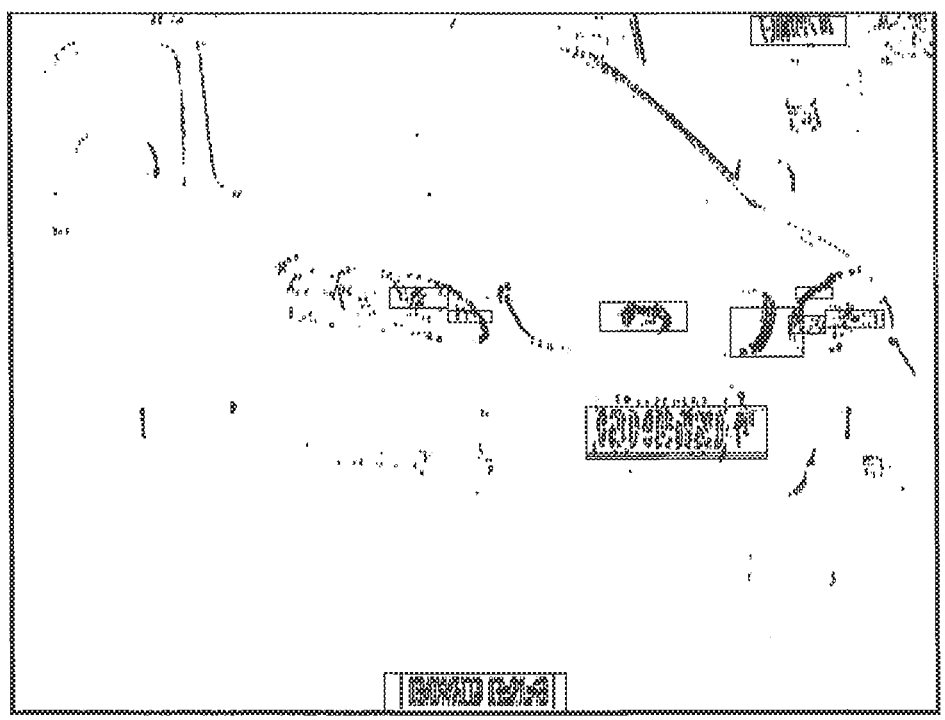
FIG. 4 is a gray-level image containing possible license plate candidates.

Once the integral image is worked out, the regions having a higher edge density are appointed as license plate candidates. Next, a predetermined threshold edge density is used to exclude the false license plate areas whose edge densities are lower than the threshold. Refer to FIG. 4. Next, some candidate license plate areas are merged according to a merging condition: each two overlapped license plate candidates whose edge densities are higher than the threshold are merged to form a merged license plate candidate. Next, some merged license plate candidates, which do not meet a vehicle license plate specification, are excluded, and the vehicle license plate specification demands that the merged candidate license plate area should have a predetermined length-to-width ratio. Thus, with the ratio, a great quantity of unqualified candidate license plate areas can be eliminated. Therefore, the region where the vehicle license plate image exists can be found out according to the threshold edge density and the vehicle license plate specification. In Step S10, the process of finding out a region where the vehicle license plate region exists has a speed of over 150 fps.

The present invention has been tested in various express highways, container docks, and parking lots, and the test results prove that the present invention has superior performance. Compared with other training type vehicle license plate detection algorithms (such as the Adaboost algorithm and the SVM algorithm), the present invention has the following advantages: (I) when a vehicle license plate appears in an image, the present invention has a very low miss rate in detecting the vehicle license plate; (II) the present invention has very high detection speed; (III) the present invention is less likely to be interfered with by the viewing angle of the camera. The algorithm of the present invention is more adaptive to the practical application environment of the vehicle license plate recognition systems. For commercial plate recognition systems, it is hard for them to spend too much time in training. When the vehicle license plate recognition system is trained by the Adaboost algorithm, it will take several days if the quantity of training data is very huge, for example, tens of thousands of training images. Not to mention the manpower spent in collecting images and undertaking training. Further, the persons who install or use the recognition system are usually not exactly the persons who implement the system. Once the application environment is not the environment used to train the system, the user, who does not get the expected performance, is likely to cause problems to the system and the manufacturer thereof. Therefore, the environmental variation tolerance of recognition systems is very important for the manufacturers.

Figure 5A:
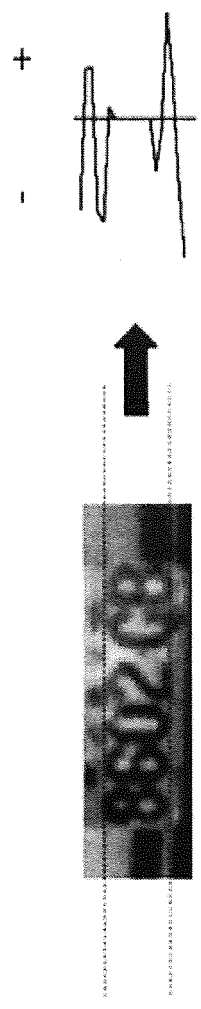
FIG. 5(a) is a diagram schematically showing a vertical projection according to one embodiment of the present invention.

In Step S12, after detecting a text area of the vehicle license plate candidate, the system uses a vertical projection method to obtain the positive projection values and negative projection values of the vehicle license plate candidate. Next, the top and bottom boundaries of the text area are defined according to the maximum values of the positive projection values and negative projection values. Referring to FIG. 5(a), the vehicle license plate candidate is divided into an upper half and a lower half. The vertical projection method calculates the greatest differences between the positive projection values and negative projection values of the upper half and the lower half regions to determine the top boundary, the bottom boundary and the height of the text area. The text area may be in a case of black characters in a white background or in a case of white characters in a black background. For example, in the case of black characters in a white background, the top boundary is determined by the minimum negative projection value (having the highest negative magnitude, i.e. having the maximum absolute value among the negative projection values); the bottom boundary is determined by the maximum positive projection value. Thus, the top and bottom boundaries of the black characters in a white ground are respectively determined and set to be $y_w^t$ and $y_w^b$, wherein the subscript w denotes a white background, and wherein the superscripts t and b respectively denote a top boundary and a bottom boundary. Thus, the height of the black characters in a white background is equal to $h_w = y_w^b - y_w^t$. In the case of white characters in a black background, the top boundary is determined by the maximum positive projection value, and the bottom boundary is determined by the minimum negative projection value. Thus, the top and bottom boundaries of the white characters in a black background are respectively determined and set to be $y_b^t$ and $y_b^b$, wherein the subscript b denotes a black background, and wherein the superscripts t and b respectively denote a top boundary and a bottom boundary. Thus, the height of the white characters in a black background is equal to $h_b = y_b^b - y_b^t$. At this stage, it is still unknown whether the vehicle license plate is in a case of black characters in a white background or in a case of white characters in a black background. Therefore, both $h_b$ and $h_w$ are calculated. The following method will be used to determine whether the vehicle license plate is in a case of black characters in a white background or in a case of white characters in a black background.

The abovementioned vertical projection technology is used to find out the top boundary $y^t$ and the bottom boundary $y^b$. As whether the characters are black characters in a white background or white characters in a black background is still unknown, the top boundaries and the bottom boundaries of both cases are calculated. Next, gray-level projection is performed on the gray-level image between top and bottom boundaries along the horizontal line according to Equation (3):

$$V(x) = \sum_{i=y^t}^{y^b} I(x, i). \quad (3)$$

Figure 5B:
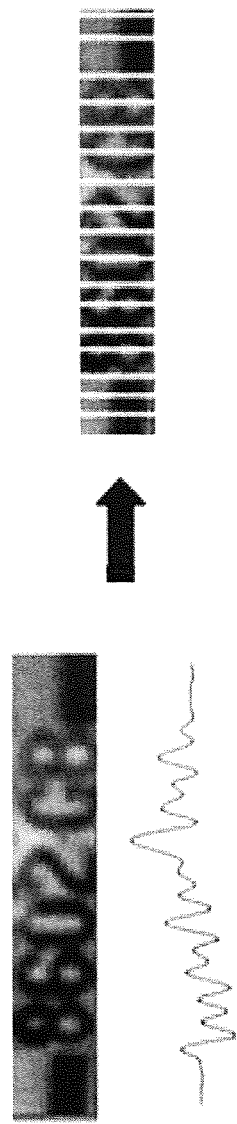
FIG. 5(b) is a diagram schematically showing a horizontal gray-level projection according to one embodiment of the present invention.

Refer to FIG. 5(b), horizontal gray-level projection is performed on the gray-level image between the top and bottom boundaries to find out the positions where a plurality of peaks exists and determine the left and right boundaries of each character image in the text area. Then, each character region is found according to the top and bottom boundaries and the left and right boundaries. In the present invention, a peak is determined according to the vertical gray-level protection values. When a position has a projection value greater than those of the left region and the right region, a peak exists at the position. In the present invention, each of the left region and the right region is defined to have a range equal to one sixth of the character height. Normally, a character image contains three vertical-projection peaks. Sometimes, a character image contains only two vertical-projection peaks. The more the vertical-projection peaks, the higher the probability of the existence of a character. The abovementioned character feature can be used to determine whether the text area is in a case of black characters in a white background or in a case of white characters in a black background.

Suppose that the license plate is in a case of black characters in a white_background. The top boundary $y_w^t$ and bottom boundary $y_w^b$ can be used to obtain the result of projection along the horizontal line, which is expressed by Equation (4):

$$V_w(x) = \sum_{i=y_w^t}^{y_w^b} I(x, i). \quad (4)$$

Suppose that the license plate is in a case of white characters in a black background. The top boundary $y_b^t$ and bottom boundary $y_b^b$ can be used to obtain the result of projection along the horizontal line, which is expressed by Equation (5):

$$V_b(x) = \sum_{i=y_b^t}^{y_b^b} I(x, i). \quad (5)$$

$V_w(x)$ can be used to obtain the count of peaks, which is expressed by $N_w^{peak}$. $V_b(x)$ can be used to obtain the count of peaks, which is expressed by $N_b^{peak}$. Whether the license plate is in a case of black characters in a white background or in a case of white characters in a black background is determined via comparing $N_w^{peak}$ and $N_b^{peak}$. In other words, if $N_w^{peak}$ is greater than $N_b^{peak}$, the license plate is in a case of black characters in a white background. If $N_b^{peak}$ is greater than $N_w^{peak}$, the license plate is in a case of white characters in a black background. After the license plate is determined to be in a case of black characters in a white background or in a case of white characters in a black background, the distance between neighboring peaks, which do not necessarily contact each other, is used as the width of a character. At the same time, the difference between the top boundary and the bottom boundary of the character image is used as the height (or length) of the character. The ratio of height to width is compared with the height-to-width ratio predetermined by the system (for example, 0.55). The closer the detected ratio to the predetermined ratio, the higher the probability that the image is a character.

Figure 6:
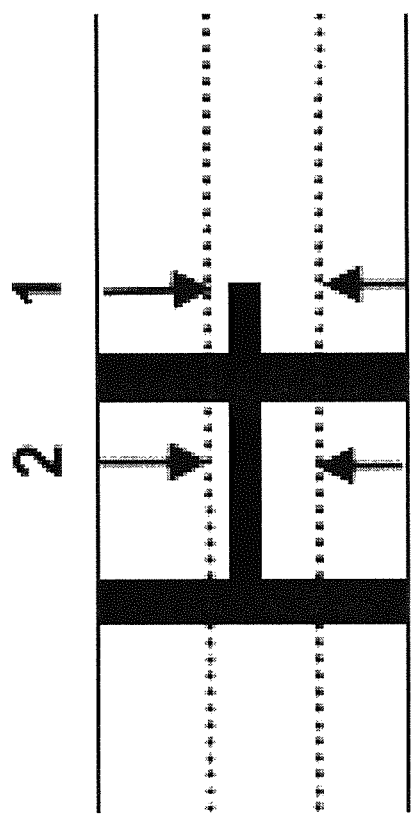
FIG. 6 is a diagram schematically showing a process for eliminating a dash according to one embodiment of the present invention.
Figure 7:
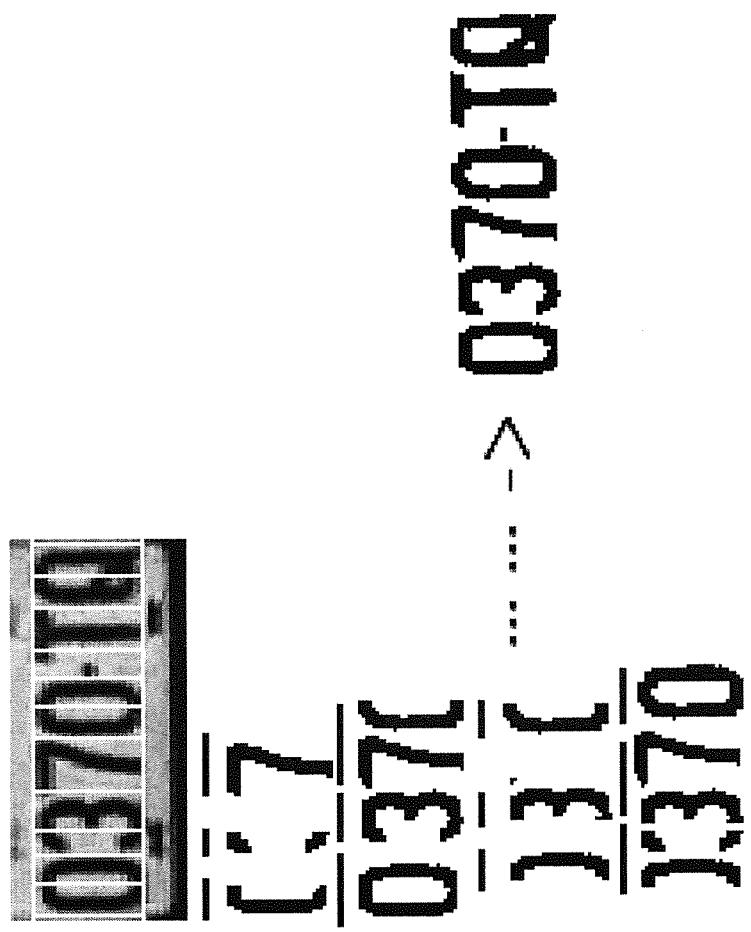
FIG. 7 is a diagram schematically showing an optimized binarized image is obtained via voting according to one embodiment of the present invention.

The text area may contain a dash. The dash may influence the tasks of character partition and recognition. In order to increase the accuracy of license plate recognition, the present invention proposes a novel scheme for recognizing and eliminating the dash. To recognize and eliminate the dash, a license plate region is divided into three equal parts each having one-third of the area of the image from top to bottom. When the middle part has a black spot and the top one-third and the bottom one-third of the region are white spots, the middle one-third one is regarded as having a dash. In the present invention, a dash is scanned and eliminated from left to right or from right to left. The scan-elimination process of a dash will stop as long as a point does not meet the judgment equation. Refer to FIG. 6. The image is scanned from right to left. The image of Position 1 meets the condition of a dash and is thus eliminated. Next, the scanning process proceeds to Position 2 at the right of "H" and stops there because the image of Position 2 does not meet the condition of a dash. At this time, the dash has been eliminated. If the scan-elimination process does not stop at this time, the image of Position 2 at the middle portion of "H" will be eliminated. Eliminating the dash makes the images of characters keep on meeting the predetermined the ratio of height-to-width. Next, based on the horizontal lines found in the abovementioned projection, vertical projection is undertaken to find peaks and define the left and right boundaries of the character images. A character partition module 14 is then used to partition the text area into a plurality of character regions. Next, the character images are binarized to obtain a plurality of binarized character images. A binarization is performed on a block between two neighboring peaks. The binarization results are examined with a voting technique to remove noise for obtaining the optimized binarization result. Refer to FIG. 7, there are three images containing the right part of "3". The three images are coincided at the same coordinates after voting. The three images at an identical coordinate are majorly voted to be black spots (front objects); it means that the image at the point is a front object. Then, the image at the point is preserved. Thus, noise can be eliminated and then an optimized binarized image is obtained.

Next, the process proceeds to Step S14, wherein a character recognition module 16 is used to recognize a plurality of characters from the binarized results according to a character identification method. Firstly, the character recognition module 16 scales the binarized character images to a predetermined size (such as 32×16). The character identification method may a cross-scan method, a histogram method, a profile-scan method, or a zoning method. Below, the process of recognizing "6" is used to demonstrate the abovementioned four character identification methods. Refer to FIG. 8(a) for the cross-scan method. Firstly, the image of "6" is horizontally scanned to determine how many positions are between a black spot and a white spot. (In other words, two side of the position are respectively a black spot and a white spot.) Next, the image of "6" is vertically scanned to determine how many positions are between a black spot and a white spot. Thereby is recognized the character "6". Refer to FIG. 8(b) for the histogram method. The histogram method calculates the horizontal and vertical projection values to recognize "6" from the binarized character image. Refer to FIG. 8(c) for the profile-scan method. The profile-scan method recognizes "6" from the binarized character image via calculating how many white spots are passed before a black spot is encountered in the horizontal direction firstly and calculating how many white spots are passed before a black spot is encountered in the vertical direction. Refer to FIG. 8(d) for the zoning method. The zoning method divides the entire character image into a plurality zones and counts how many black spots is contained in each zone to recognize "6" from the binarized character image. Via the abovementioned character identification methods, the present invention can recognize characters from the binarized character images one by one. The characters may be Arabic numerals or English letters.

Next, in Step S16, a character recombination module 18 is used to integrate the characters into a character string of a license plate. In order to increase the recognition accuracy, the present invention recombines the character string to meet the vehicle license plate rule. For example, in Taiwan, there are 6-character vehicle license plates for common automobiles and trucks, etc; there are also 5-character vehicle license plates for taxis, buses, tourist coaches, large-size container cars, etc. The 6-character strings are in form of 2 characters-4 characters or 4 characters-2 characters, wherein the 2-character string contains at least one English letter, and the 4-character string contains only Arabic numerals; for example, the character strings 2D-4345, 5435-D3, AY-5343 and 6345-HY all belong to the 6-character vehicle license plates. The 5-character strings are in form of 2 characters-3 characters or 3 characters-2 characters, wherein the 2-character string contains at least one English letter, and the 3-character string contains only Arabic numerals; for example, the character strings 3D-434, AD-323, 736-D5, and 643-AT all belong to the 5-character vehicle license plates. After a string of characters has been recognized, the characters are recombined to have a form meeting the rule of vehicle license plates in Taiwan. Sometimes, more than one character string is output for a single license plate image.

In Step S18, the system receives a next image of the same vehicle, which is captured at a next time point, and repeats Step S10 to Step S16 to obtain a new character string from a vehicle license plate image in the next image. Next, a voting module 20 is used to compare the preceding character string with the new character string character by character to enhance the accuracy and reliability of recognition. When the images are input to the license plate detection module 12 one after one, voting is performed on the recognition results of the vehicle license plate images captured at different time points to further improve the recognition results. For example, the ith image is compared with the (i+1)th image to determine whether they coincide. If they coincide partially, text voting is undertaken. When a character string meeting the vehicle license plate rule is obtained, the system examines whether the voting area has any character string completely identical to the abovementioned character string. If there is no character string completely identical to the abovementioned character string, the abovementioned character string is stored into the voting area. If the voting area has a character string not completely identical to but similar to the abovementioned character string, a weighted value is added to the voting area. The weighted value is the percentage of the similarity of character strings. Suppose that a character string "5D-4243" has existed in the voting area and that a new character string "5D-4241" is obtained from the image captured at a different time point. The new character string "5D-4241" is stored into the voting area. Then, the new character string "5D-4241" is compared with the character string "5D-4243". As long as the same positions have an identical character, a weighted value is added to "5D-4243". Each character has a corresponding weighted value. The average of all the weighted values is equal to the recognition reliability of the present invention.

The present invention utilizes an edge-labeling technology to detect vehicle license plates. The edge information is used to fast and precisely determine the position of the vehicle license plate. Thereby, the present invention is exempted from spending time in image training required by the conventional technologies. Further, the present invention partitions the gray-level images into a plurality of character images and binarizes the character images to obtain a plurality of optimized and stable binarized character images. Thereby, the present invention is exempted from low recognition ability caused by a great amount of noise occurring in the conventional binarization technology. The present invention can tolerate images captured from different view angles. Further, the present invention can fast define the position of a vehicle license plate in the image captured in any background. Furthermore, the present invention can effectively eliminate noise from images to promote recognition quality, whereby a vehicle license plate is precisely recognized in real time.

The embodiments described above are only to exemplify the present invention but not to limit the scope of the present invention. Any equivalent modification or variation according to the spirit of the present invention is to be also included within the scope of the present invention.

What is claimed is:

1. A vehicle license plate recognition method comprising: Step (a): converting an image of a vehicle into a gray-level image, calculating edge densities of said gray-level image, and defining a region from a plurality of regions where a vehicle license plate image exists according to said edge densities and a vehicle license plate specification, wherein regions having a higher value of said edge density are appointed as candidate license plate areas, and using a predetermined threshold edge density to exclude said candidate license plate areas having said edge density lower than said predetermined threshold edge density; Step (b): detecting a text area of said vehicle license plate image, partitioning said text area into a plurality of character images, and binarizing said character images to obtain a plurality of binarized character images; Step (c): recognizing a plurality of characters from said binarized character images; Step (d): recombining said characters into a character string of a vehicle license plate and outputting said character string; and Step (e): receiving a next image of said vehicle, which is captured at a different time point, and repeating Step (a) to said Step (d) to obtain a new character string from said next image; comparing said character string with said new character string character by character to obtain a comparison result for verifying reliability of recognition.

2. The vehicle license plate recognition method according to claim 1, wherein said image is captured by an image capture device.

3. The vehicle license plate recognition method according to claim 1, wherein said gray-level is divided into a plurality of sections, and wherein an integral image technology is used to calculate said edge densities of each of said sections.

4. The vehicle license plate recognition method according to claim 3, wherein said integral image technology accumulates the gradient magnitudes of each pixel of said gray-level image, and wherein said edge density equals to a sum of said gradient magnitudes divided by a region size.

5. The vehicle license plate recognition method according to claim 1, wherein said candidate license plate areas having said edge density higher than said predetermined threshold edge density are merged according to a merging condition to form a plurality of merged candidate license plate areas, and wherein said merged candidate license plate areas that do not meeting said vehicle license plate specification are excluded.

6. The vehicle license plate recognition method according to claim 5, wherein said merging condition is that each two said candidate license plate areas that overlap are merged to form one said merged candidate license plate area.

7. The vehicle license plate recognition method according to claim 1, wherein said vehicle license plate specification is a predetermined width-to-width ratio.

8. The vehicle license plate recognition method according to claim 1, wherein a vertical projection technology is used to obtain positive projection values and negative projection values of said vehicle license plate image, and wherein maximums of said positive projection values and said negative projection values are used to define a top boundary and a bottom boundary of said text area, and wherein a horizontal gray-level projection is performed on a region between said top boundary and said bottom boundary to find out a plurality of peaks, and wherein said peaks are used to define a left boundary and a right boundary of each character image in said text area, and wherein said character image is partitioned according to said top boundary, said bottom boundary, said left boundary and said right boundary.

9. The vehicle license plate recognition method according to claim 8, wherein said vehicle license plate image is divided into an upper half and a lower half, and wherein said vertical projection technology calculates maximums of said positive projection values and said negative projection values of said upper half and said lower half to determine a top boundary and a bottom boundary of said text area in a cases of white characters in a black background or in a case of black characters in a white background and determine height of said characters, and wherein positions of said peaks are used to determine whether said text area is in a case of white characters in a black background or in a case of black characters in a white background.

10. A vehicle license plate recognition system comprising a license plate detection module detecting an image, converting said image into a gray-level image, calculating edge densities of said gray-level image, and defining a region from plurality of a regions where a vehicle license plate image exists according to said edge densities and a vehicle license plate specification, wherein regions having a higher value of said edge density are appointed as candidate license plate areas, and using a predetermined threshold edge density to exclude said candidate license plate areas having said edge density lower than said predetermined threshold edge density, a character partition module connected with said license plate detection module, partitioning said vehicle license plate image into a plurality of character images, and binarizing said character images to obtain a plurality of binarized character images; a character recognition module connected with said character partition module, recognizing characters from said binarized character images; a character recombination module connected with said character recognition module, recombining said characters into a character string of a vehicle license plate, and outputting said character string; and a voting module connected with said character recognition module, obtaining a new character string generated in a next time point, comparing said character string with said new character string character by character to generate a comparison result for verifying reliability of recognition.

11. The vehicle license plate recognition system according to claim 10, wherein an image capture device captures said image and sends said image to said license plate detection module.

12. The vehicle license plate recognition system according to claim 10, wherein said license plate detection module divides said gray-level image into a plurality of sections, and an integral image technology is used to calculate edge densities of all said sections.

13. The vehicle license plate recognition system according to claim 12, wherein said integral image technology accumulates the gradient magnitudes of pixels of said gray-level image, and wherein said edge density equals to a sum of said gradient magnitudes divided by a region size.

14. The vehicle license plate recognition system according to claim 10, wherein said merging condition is that each two said candidate license plate areas that overlap are merged to form one said merged candidate license plate area.

15. The vehicle license plate recognition system according to claim 10, wherein said license plate detection module uses a vertical projection technology to obtain positive projection values and negative projection values of said vehicle license plate image, uses maximums of said positive projection values and said negative projection values to define a top boundary and a bottom boundary of a text area of said vehicle license plate image, performs a horizontal gray-level projection on an area between said top boundary and said bottom boundary to find out a plurality of peaks, and defines a left boundary and a right boundary of each said character in said text area according to said peaks, and wherein said character partition module partitions said vehicle license plate image into said character images according to said top boundary, said bottom boundary, said left boundary and said right boundary.

16. The vehicle license plate recognition system according to claim 15, wherein said vehicle license plate image is divided into an upper half and a lower half, and wherein said vertical projection technology calculates maximums of said positive projection values and said negative projection values of said upper half and said lower half to determine a top boundary and a bottom boundary of said text area in a cases of white characters in a black background or in a case of black characters in a white background and determine height of said characters, and wherein positions of said peaks are used to determine whether said text area is in a case of white characters in a black background or in a case of black characters in a white background.

17. The vehicle license plate recognition system according to claim 10, wherein said character partition module performs binarization on a block between two neighboring peaks of each said character image to obtain said binarized character images corresponding to said character images.

* * * * *